United States Patent
Coppin et al.

(10) Patent No.: US 10,338,704 B2
(45) Date of Patent: Jul. 2, 2019

(54) MITIGATING DISPLAY NOISE FOR TOUCH AND PEN SENSING

(71) Applicant: Microsoft Technology Licensing, LLC, Redmond, WA (US)

(72) Inventors: Justin Allan Coppin, Fort Collins, CO (US); Eran Arbel, Netanya (IL); Amir Zyskind, Natania (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 15/399,235

(22) Filed: Jan. 5, 2017

(65) Prior Publication Data
US 2018/0188832 A1    Jul. 5, 2018

(51) Int. Cl.
| G06F 3/041 | (2006.01) |
| G06F 3/038 | (2013.01) |
| G06F 3/044 | (2006.01) |
| G06F 3/0354 | (2013.01) |

(52) U.S. Cl.
CPC ........ *G06F 3/0383* (2013.01); *G06F 3/03545* (2013.01); *G06F 3/044* (2013.01); *G06F 3/0412* (2013.01); *G06F 3/0416* (2013.01); *G06F 2203/04105* (2013.01); *G09G 2310/065* (2013.01); *G09G 2340/0435* (2013.01); *G09G 2354/00* (2013.01)

(58) Field of Classification Search
None
See application file for complete search history.

(56) References Cited

U.S. PATENT DOCUMENTS

| 2010/0155153 | A1 | 6/2010 | Zachut |
| 2013/0057511 | A1 | 3/2013 | Shepelev et al. |
| 2013/0176251 | A1* | 7/2013 | Wyatt .......... G06F 3/0416 345/173 |
| 2013/0194229 | A1 | 8/2013 | Sabo et al. |
| 2013/0207925 | A1 | 8/2013 | Ryshtun et al. |
| 2013/0300846 | A1 | 11/2013 | Miller et al. |
| 2014/0354555 | A1 | 12/2014 | Shahparnia et al. |
| 2015/0022463 | A1 | 1/2015 | Kelso et al. |
| 2015/0194137 | A1 | 7/2015 | Wyatt |

(Continued)

OTHER PUBLICATIONS

"How Synaptics TDsync Technology Eliminates Problems Caused by Display Noise in Smartphones and Tablets", http://www.synaptics.com/sites/default/files/tdsync-eliminates-smartphone-tablet-display-noise.pdf, Retrieved on: Oct. 27, 2016, pp. 1-3.

(Continued)

*Primary Examiner* — Christopher J Kohlman
(74) *Attorney, Agent, or Firm* — Holzer Patel Drennan

(57) ABSTRACT

A display device includes a display controller and a timing controller to drive frames at a frame rate onto a display. The display device may include sensor circuitry to detect a signal from a pen. The signal from the pen includes a sync signal indicative of a repetition rate of the signal. In one embodiment, the sync signal and the display timer are asynchronous. The sensor circuitry is configured to sense the signal from the pen during sensing windows, where timing of the sensing windows is based on the repetition rate. In one embodiment, the display controller is configured to pause driving a frame onto the display during the sensing windows.

20 Claims, 11 Drawing Sheets

(56) References Cited

U.S. PATENT DOCUMENTS

| | | | |
|---|---|---|---|
| 2015/0355762 A1* | 12/2015 | Tripathi | G06T 1/20 |
| | | | 345/173 |
| 2016/0092010 A1* | 3/2016 | Agarwal | G06F 3/0412 |
| | | | 345/173 |
| 2016/0179226 A1 | 6/2016 | Shepelev et al. | |
| 2016/0195944 A1 | 7/2016 | Gur et al. | |

OTHER PUBLICATIONS

"International Search Report and Written Opinion Issued in PCT Application No. PCT/US2017/068852", dated Mar. 29, 2018, 12 pages.

* cited by examiner

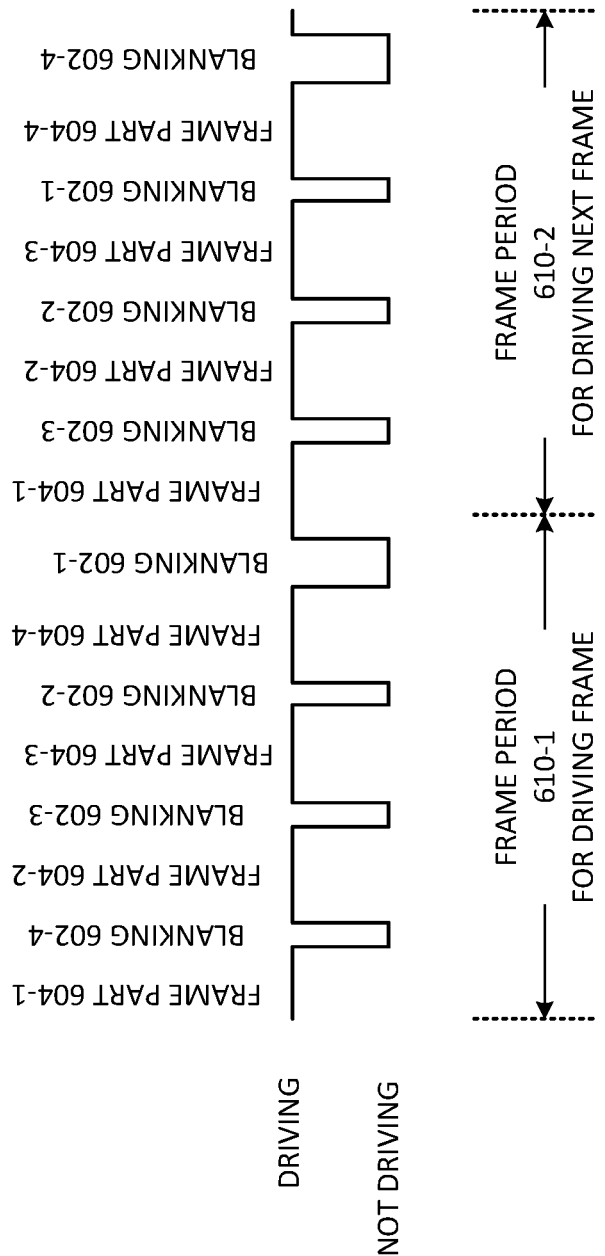

MITIGATING DISPLAY NOISE FOR TOUCH AND PEN SENSING

Consumers often prefer lighter and thinner mobile devices, such as tablet computers, mobile telephones, and laptops. To construct thin and light devices, manufacturers closely integrate components of the devices. As components become more closely integrated, however, some components may create electrical interference for other components.

BRIEF DESCRIPTION OF THE DRAWINGS

FIG. 6C is a timing diagram for a frame period with a vertical-blanking interval and mid-frame blanking intervals;

DESCRIPTION

The following detailed description refers to the accompanying drawings. The same reference numbers in different drawings may identify the same or similar elements. Also, the following detailed description is exemplary and explanatory only and is not restrictive of the invention, as claimed.

Computing devices and display devices may be able to sense a pen/stylus or a fingertip. The sensors used to detect pens and fingers may be closely integrated with the display of the device. As a result, the accuracy of the sensors can be negatively influenced by noise generated by driving pixels on the display.

In a display system where there are blanking intervals (pauses to the driving of pixels on the display) coincident with touch or pen sensing, the quality of the touch/pen measurement will be improved due to the increased signal to noise ratio (SNR). The improved measurement translates into improvements to the user experience in terms of accuracy, jitter, hover height, etc. of determined locations of a pen or fingertip on a display.

Figure 1:
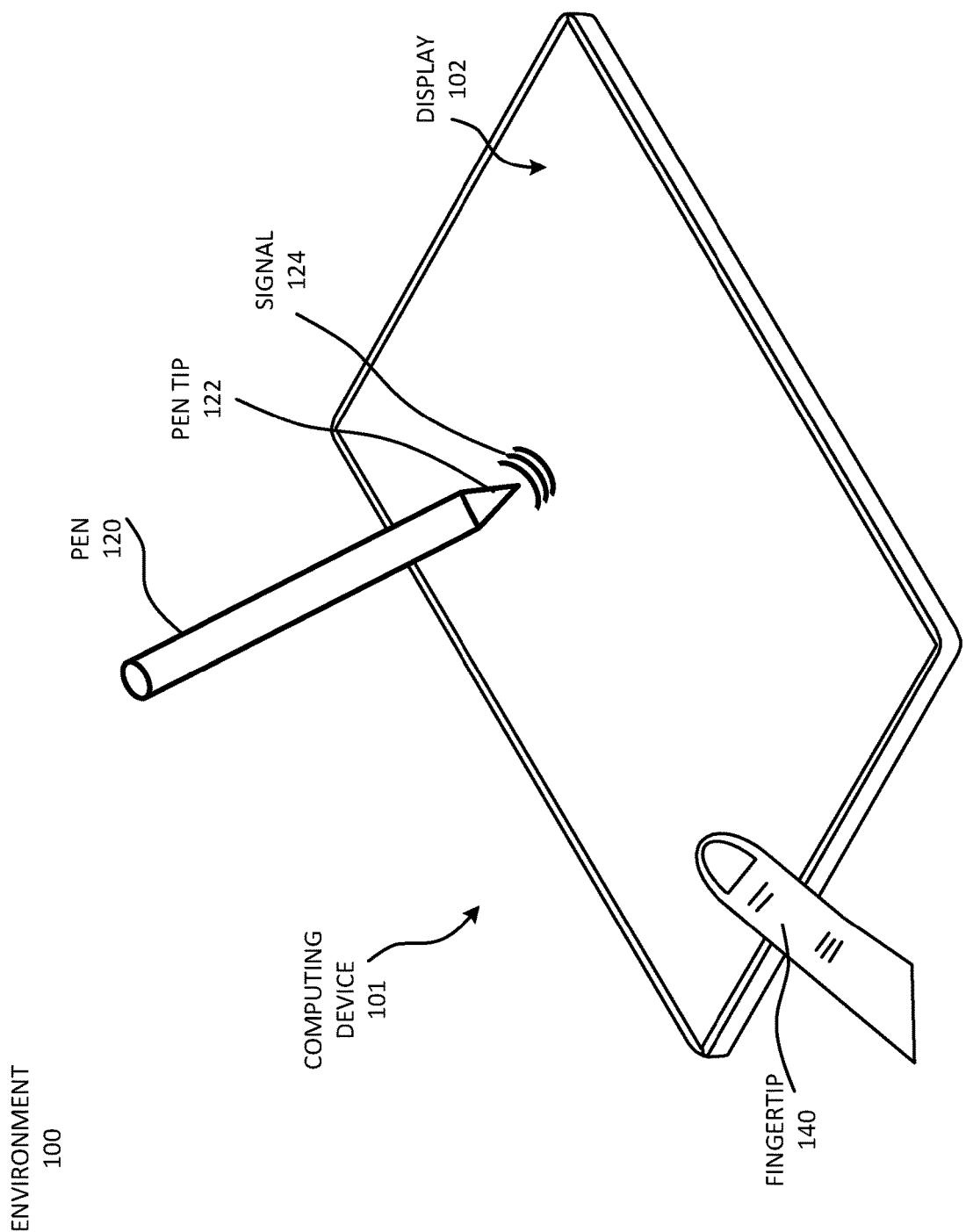
FIG. 1 is a perspective view of an exemplary environment in which a pen or stylus interacts with a display of a computing device.

FIG. 1 is a perspective view of an exemplary environment 100 in which an object, such as a pen or stylus 120 and/or a fingertip 140, interacts with a display 102 of a computing device 101. Although computing device 101 is shown as a tablet computer in FIG. 1, computing device 101 may be a mobile phone, a laptop, or any other device with a display for viewing. Display 102 can show images and/or video for viewing by a user. Display 102 also includes sensing circuitry to receive input from pen 120 (e.g., pen tip 122), fingertip 140, a palm (not shown), hand (not shown), or multiple fingertips (not shown). Pen 120 may also transmit a signal 124 for the sensing circuitry in display 102 of computing device to detect.

Alternatively or additionally, pen 120 may be any object that communicates with display 102, such as a mouse on or near display 102, a dial on or near display 102, a "puck" on or near display 102, and/or a brush on or near display 102. In addition, any of these objects may be passive (e.g., they do not actively transmit signal 124).

Figure 2:
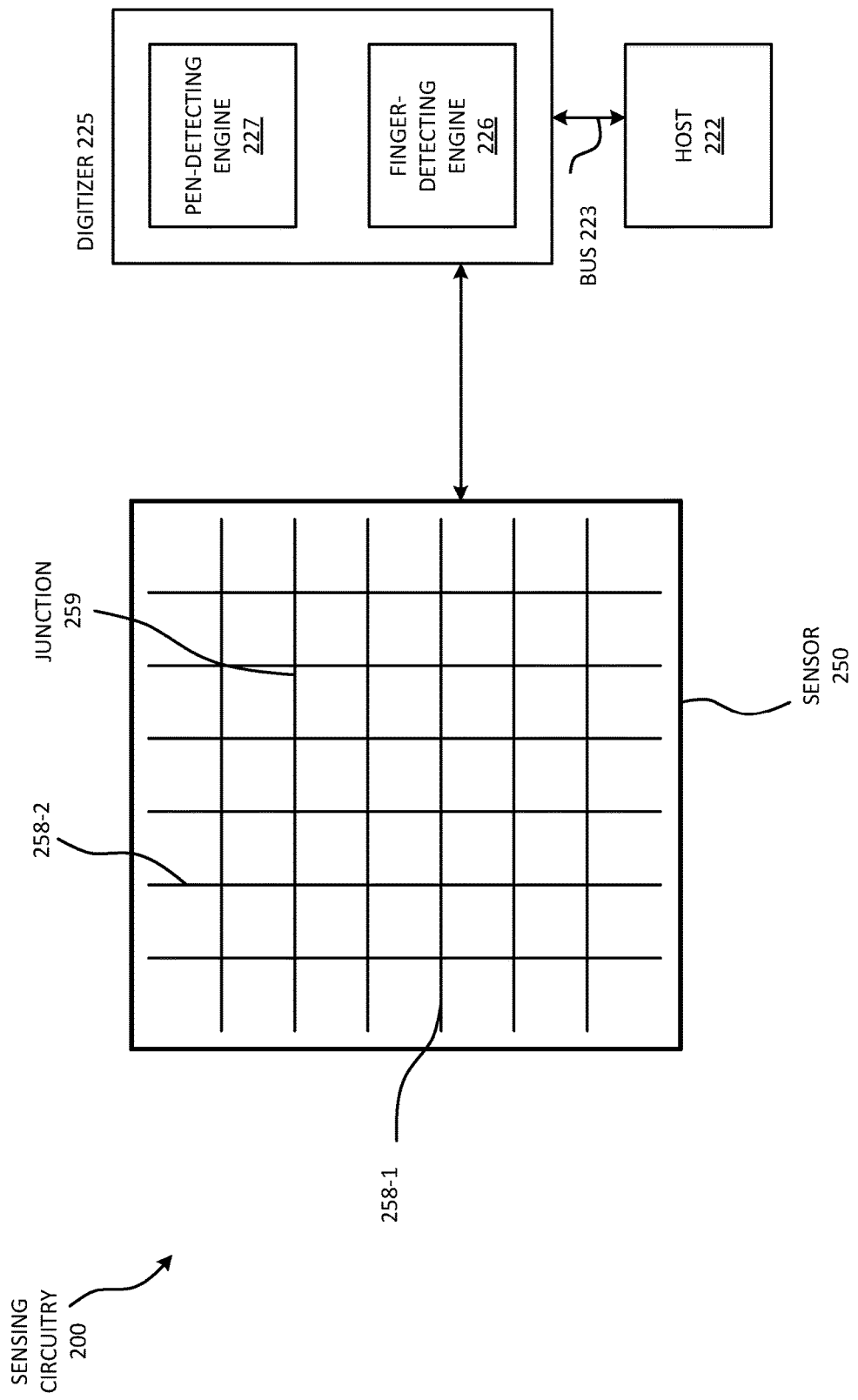
FIG. 2 is a block diagram of exemplary sensing circuitry of a display in a computing device in one embodiment.

FIG. 2 is a block diagram of exemplary sensing circuitry 200 of computing device 101 (e.g., display 102) in one embodiment. Sensing circuitry 200 may be integrated with and/or laminated onto display 102. Sensing circuitry 200 includes a sensor 250, digitizer 225, a host 222, and a bus 223.

Sensing circuitry 200 senses pen 120 on or near display 102 and may determine information regarding pen 120 (e.g., location, pressure on tip 122 of pen 120). Sensor circuitry 200 may also sense fingertip 140 on or near display 102 and determine information regarding fingertip 140 (e.g., location, pressure). Sensing circuitry 200 may use any combination of sensor components and sensing technologies to detect touch events on display 102.

In one example, sensing circuitry 200 may include in-cell touch/display technology that has a touch sensor integrated within the metallization layers used for updating a liquid crystal display. In another example, sensing circuitry 200 may include a sensor 250 formed of conductors 258 (e.g., in overlapping rows 258-1 and columns of conductors 258-2 in different planes). Conductors 258 may be insulated from one another. In one embodiment, conductors 258 are arranged to enhance capacitive coupling between row conductors 258-1 and column conductors 258-2. Capacitance between conductors 258 is sensitive to presence of conductive and dielectric objects (e.g., pen tip 122 and/or fingertip 140). As another example, sensor 250 is not formed based on rows and columns of conductors 258. Rather, sensor 250 may be formed with a matrix of electrode junctions.

According to one embodiment, conductors 258 can detect touch of pen 120 (e.g., tip 122), fingertip 140, a hand (not shown), and/or other conductive objects. In one embodiment, pen 120 transmits an electromagnetic signal 124 from tip 122 for sensor 250 to receive. In this embodiment, pen 120 transmits signal 124 and sensor 250 receives the signal transmitted by pen 120. In some embodiments, pen 120 may also transmit encoded information in signal 124. In this case, sensing circuitry may demodulate and decode signal 124 to retrieve information.

In one embodiment, sensing circuitry 200 can trigger conductors 258 (e.g., apply a signal) so as to enhance sensing of fingertip 140. Sensing circuitry 200 can also detect signal 124 emitted from pen 120. According to one embodiment, signal 124 includes timing information. Upon receiving signal 124 in sensor 250, sensing circuitry 200 can extract the timing information and sense pen 120 according to the timing information. In one embodiment, the triggering of conductors 258 may not be required for detecting pen 120 (e.g., pen 120 emits an active signal 124).

Conductors 258 are connected to digitizer circuitry 225 (or simply "digitizer 225"). Digitizer 225 may sample and quantize output from conductors 258 to determine information (e.g., a characteristic) about pen 120 and/or fingertip 140. For example, digitizer 225 can determine the location of pen 120 above display 102, the pressure on tip 122, and the location of fingertip 140 above display 102. In one embodiment, digitizer 225 includes a pen-detecting engine 227 for extracting a timing or sync signal from signal 124. Pen-detecting engine 227 may also process and/or decode other information received from pen 120 or may track the location of pen 120. For example, information transmitted from pen 120 may include indications of a button (not shown) having been pressed, pressure on tip 122, or tilt.

In one embodiment, digitizer 225 may apply mutual capacitance detection or a self-capacitance for sensing fingertip 140. In this mode for detecting fingertip 140, digitizer 225 may send a triggering signal, e.g. a pulse to one or more conductors 258 of sensor 250 and samples output from conductors 258 (e.g., different conductors 258) in response to the triggering. In one embodiment, row conductors 258-1 are triggered and column conductors 258-2 are sampled. This procedure may enable the sensing of multiple fingertips 140 by sensor 250 at the same time. Digitizer 225 may include finger-detection engine 226 for controlling the triggering signal, for processing the touch signal and for tracking the location of one or more fingertips 140.

Output from digitizer 225 may be reported to host 222 via a bus 223. The output reported by digitizer 225 may include information to identify the location of one or more fingertips 140, location of tip 122 of pen 120 and additional information provided by pen 120, such as pressure, tilt, etc. Digitizer 225 may employ both analog and digital processing to signal 124 detected with sensor 250. Some or all of the functions of engines 226 and 227 may be integrated in one or more processing units adapted for controlling sensor 250. Some or all of the functions of digitizer 225, engines 226 and 227 may be integrated or included in host 222. Host 222 may transmit the information to an operating system, an application manager, or an application running in host 222 of computing device 101.

Figure 3:
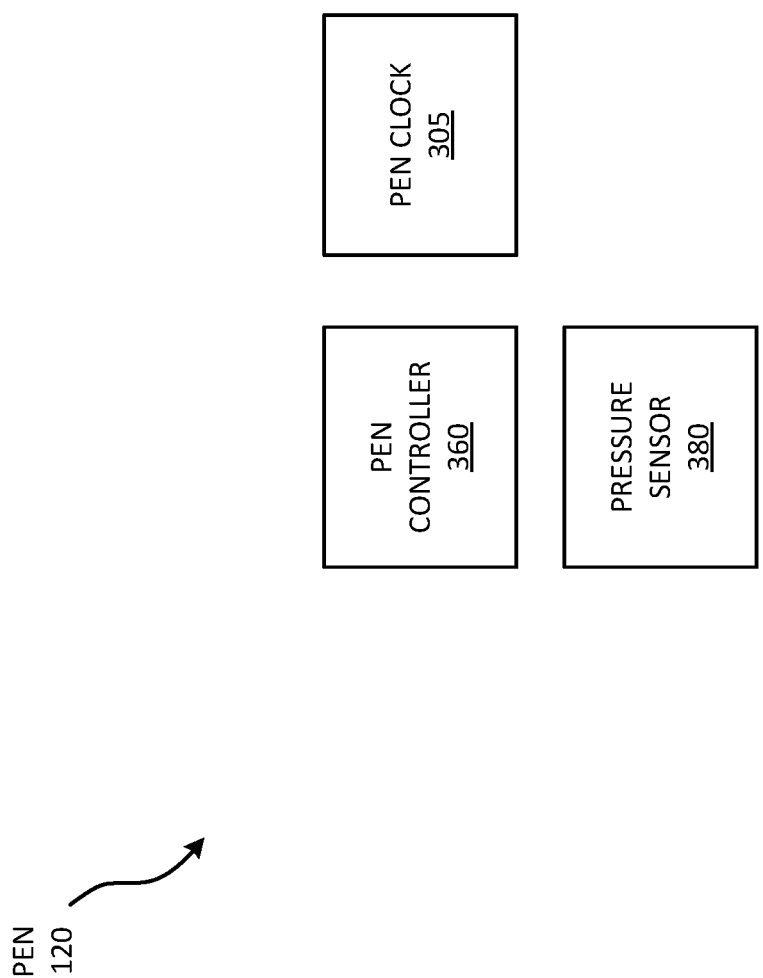
FIG. 3 is a block diagram of exemplary components of a pen or stylus in one embodiment.

As noted above, sensing circuitry receives signal 124 transmitted from pen 120. FIG. 3 is a block diagram of exemplary components of pen 120 in one embodiment. As shown in FIG. 3, pen 120 includes a pen controller 360 (or a "control module"), a pressure sensor 380, and a pen clock 305.

Pen controller 360 controls or manages the operations of pen 120. In one embodiment, pen controller 360 includes an ASIC and/or programmable logic devices. Pen controller 360 may manage the generation of signal 124. For example, pen controller 360 may include counters and/or dividers (e.g., processors, flip-flop circuits) that alter or adjust the timing associated with signal 124. Pen controller 360 may encode (e.g., digitally) information generated, stored, or sensed by pen 120 into signal 124. Pen controller 360 may also control a characteristic of signal 124 (e.g., frequency in an analog manner) to convey information in signal 124

Pen clock 305 may include an oscillator, crystal (e.g., a 32.768 kHz crystal), etc., for use by pen controller 360. For example, pen clock 305 enables pen controller 360 to generate and transmit signal 124 with particular timing, at particular frequencies, for particular time periods, etc. Pen clock 305 may also enable pen controller 360 to generate and transmit a timing or synchronization ("sync") signal to be included in signal 124.

Signal 124 may include a timing signal. As described below, in one embodiment, the timing in signal 124 is not in sync with the timing signals for displaying frames on display 102 of computing device 101. That is, the timing signal of signal 124 is asynchronous with respect to the timing signals for displaying frames on display 102. Because sensing circuitry 200 is in sync with signal 124, sensing circuitry 200 is also asynchronous with display controller 516.

Tip 122 of pen 120 may include a pressure sensor 380. Pressure sensor 380 may detect a pressure associated with tip 122 or if no pressure is applied to tip 122. Pressure sensor 380 provides input to pen controller 360. Based on the input from pressure sensor 380, pen controller 360 may generate or adjust the signal 124 (e.g., changing a characteristic of signal 124 in an analog fashion or encoding the pressure in signal 124 in a digital fashion).

Figure 4:
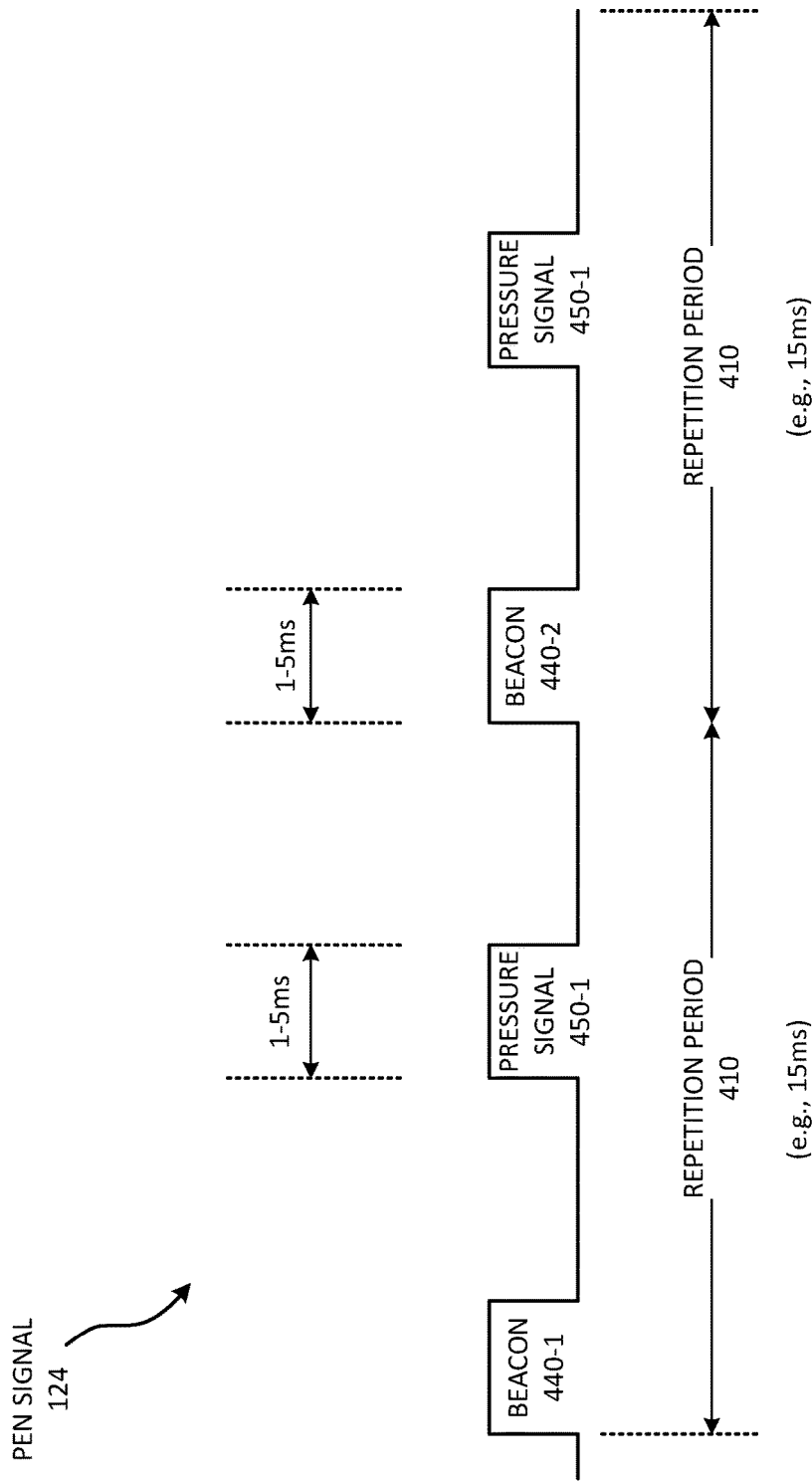
FIG. 4 is timing diagram illustrating an exemplary signal emitted by the tip of a pen or stylus.

As noted above, signal 124 may include timing information and, in some embodiments, other information. FIG. 4 is timing diagram (not drawn to scale) illustrating an exemplary signal 124 emitted by tip 122 of pen 120. As shown in FIG. 4, signal 124 may be transmitted repeatedly with a repetition period 410 (and a repetition rate that is the reciprocal of the repetition period). In one embodiment, such as the embodiment shown in FIG. 4, repetition period is 15 ms and the repetition rate is approximately 66 Hz. FIG. 4 is one example of signal 124. Other repetition periods, repetition rates, and protocols for signal 124 are possible.

In one embodiment, pen signal 124 includes signal bursts, such as beacon signal bursts 440 (or "beacons 440") and/or pressure signal bursts 450 (or "pressure signals 450"). In one embodiment, signal bursts 440, 450 may be transmitted in a predetermined sequence according to a predetermined schedule. Pen controller 360 is configured to set the timing associated with beacons 440 and pressure signals 450. Pen controller 260 may set the timing such that sensing circuitry 200 anticipates beacons 440 and/or pressure signals 450 according to the predetermined sequence and/or the predetermined schedule.

Beacons 440 may convey timing information to sensing circuitry 200 (e.g., as measured from the rising and/or falling edge of beacons 440). As such, beacons 440 may be considered a synchronization signal (or "sync signal"). In one embodiment, sensing circuitry 200 may synchronize some functions with beacons 440, such as when to sense for beacons 440 in signal 124 and/or pressure signals 450 if signal 124 includes pressure signals 450. In addition, sensing circuitry 200 may synchronize the triggering of conductors 258 to sense touch of fingertip 140 with beacons 440. In one embodiment, beacons 440 also enable computing device 101 to identify a location or proximity of tip 122 of pen 120 relative to display 102. Beacons 440 may include, for example, signal pulses for approximately 1 to 5 ms. Beacons 440 may include any type of signal to convey timing or a sync signal.

As noted, in one embodiment signal 124 may convey information other than timing information, such as if and when pressure is applied to tip 122 of pen 120. That is, signal 124 may include pressure signals that convey information associated with a pressure sensor 380 at tip 122 of pen 120. Sensing circuitry 200 may determine whether pressure is applied to tip 122 of pen 120 by detecting pressure signals 450. Pressure signals 450 may convey pressure information by varying an analog characteristic of signal 124 (e.g., frequency modulation). Alternatively, pressure signals 450 may convey pressure information by encoding digital information into signal 124 (e.g., frequency-shift keying). In one embodiment, pen 120 transmits a pressure signal 450-1 half way through repetition period 410 (e.g., approximately 7.5 ms into repetition period 410). Pressure signals 450 may include pulses for a duration of approximately 1 to 5 ms. In one embodiment, pressure signals 450 are not transmitted and signal 124 includes only beacons 440.

Signal 124 is exemplary. Additional or less information may be sent in signal 124, such as additional pressure information from the other end of pen 120, a pen identification, etc.

Figure 5:
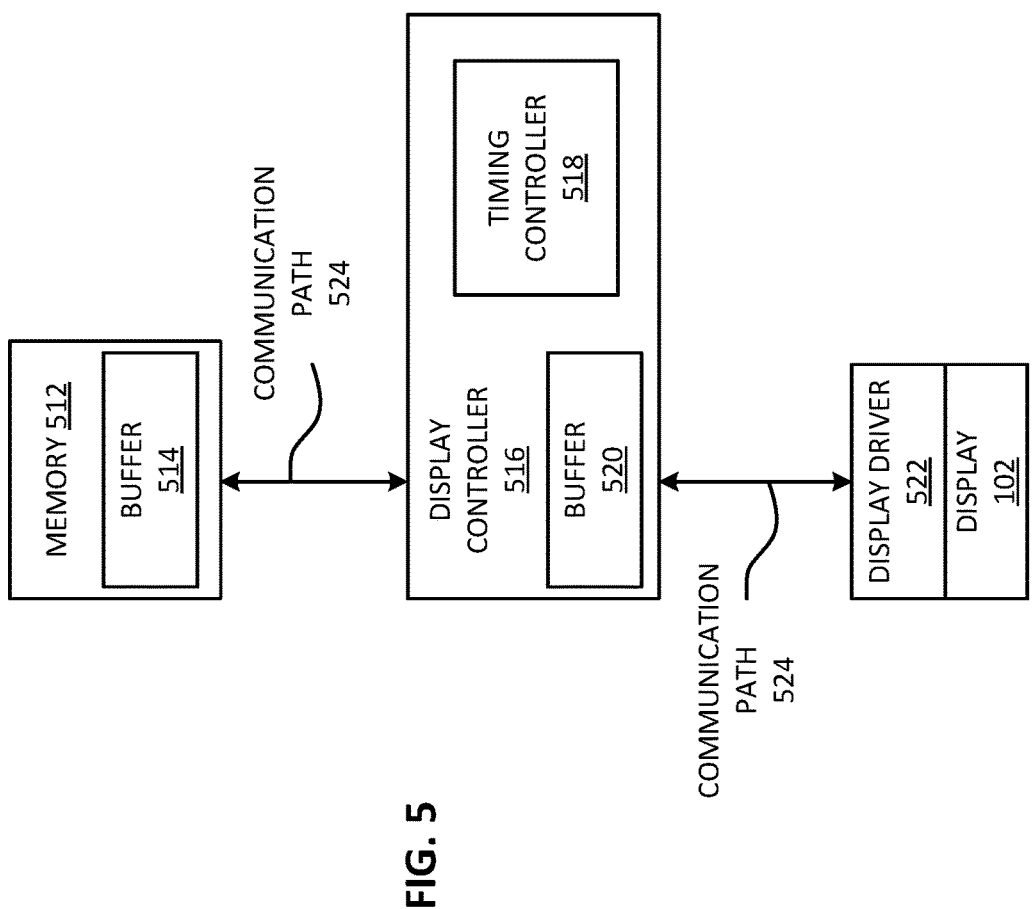
FIG. 5 is a block diagram of components for displaying information on a display of a computing device in one embodiment.

FIG. 5 is a block diagram of one embodiment of components for displaying information on display 102 of computing device 101 in one embodiment. These components include a memory 512, a display controller 516, a display driver 522, display 102, and/or a communication path 524. Memory 512 may include buffer 514. Display controller 516 may include buffer 520, and/or a timing controller 518.

Communication path 524, such as a bus, provides a communication path between components in computing device 101 including those shown in FIG. 5. Path 524 may include any type of interconnect and provide support for any type of protocol for communicating among the components of computing device 101.

Memory 512 may include circuitry to receive memory requests (e.g., read) from display controller 516 and for responding to the requests. Memory 512 may include static random-access memory (RAM), dynamic RAM, synchronous dynamic DRAM, etc.

Display controller 516 is coupled to display driver 522 of display 102. Display controller 516 includes hardware configured to prepare a frame for display on display 102. Display controller 516 is configured to retrieve frames from buffer 514 in memory 512, composite the frames, and pass resulting frames to display driver 522 to display results on display 102.

Display controller 516 may also include one or more buffers 520 for queuing data (e.g., frames) for sending to display driver 522. In one embodiment, buffer 520 may be used for self-refresh of display 102.

Display controller 516 may also include hardware that sends control signals as well as frames for display on display 102. Control signals may include timing signals, such a clock signal(s), vertical-blanking control signal(s), and horizontal-blanking control signal(s). Display controller 516 may control the display driver 522 and display 102 in real-time, providing data describing pixels and sub-pixels to be displayed while display 102 is displaying the pixels.

Display controller 516 includes timing controller 518. Timing controller 518 may include a crystal, oscillator, etc. to aid display controller 516 to schedule sending frames and/or parts of frames (e.g., lines and/or pixels) and data to display driver 522. For example, display controller 516 may send frames to display driver 522 at a rate of 30, 60, 120, and/or 180 frames per second, for example. In one embodiment, display controller 516 is not in sync with sensing circuitry 200. That is, timing controller 518 and/or display controller 516 is asynchronous with respect to the timing signals for sensing information by sensing circuitry 200. Because sensing circuitry 200 is in sync with signal 124 from pen 120, display controller 516 is also asynchronous with respect to the timing of transmission of signal 124 in this embodiment (and vice versa). Because the timing of transmission of signal 124 can be asynchronous with respect to the timing of display controller 516, this embodiment may not require a feedback signal to be received in pen 120 from display controller 516 (e.g., as part of a closed-loop control) to keep signal 124 synchronous with timing controller 518. In some cases, elimination of a feedback signal could potentially save pen 120 from carrying a receiver to receive any feedback signal.

Display driver 522 includes circuitry and logic for driving the display of pixels onto the display 102. Frames sent to display driver 522 may include color information, such as intensity for red, green, and blue for each pixel. In one embodiment, display driver 522 may include a buffer to supplement or replace buffer 520 in display controller 516. In one embodiment, a buffer in display driver 522 may be used for self-refresh of display 102.

Display 102 may include a liquid crystal display (LCD). Methods and systems described herein, however, may be incorporated and applied into any type of display, such as an organic light-emitting diode display (OLED), surface-conduction electron-emitter display (SED), field-emission display (FED), cathode ray tube (CRT) display, light-emitting diode display (LED), electroluminescent display (ELD), electronic paper or e-ink display, a high-performance addressing LCD display, a quantum dot display, and/or an interferometric modular display. Display 102 may be integrated into the same housing as memory 112, display controller 516, and/or display driver 522, or may be separate and have a separate housing, for example.

Figure 6A:
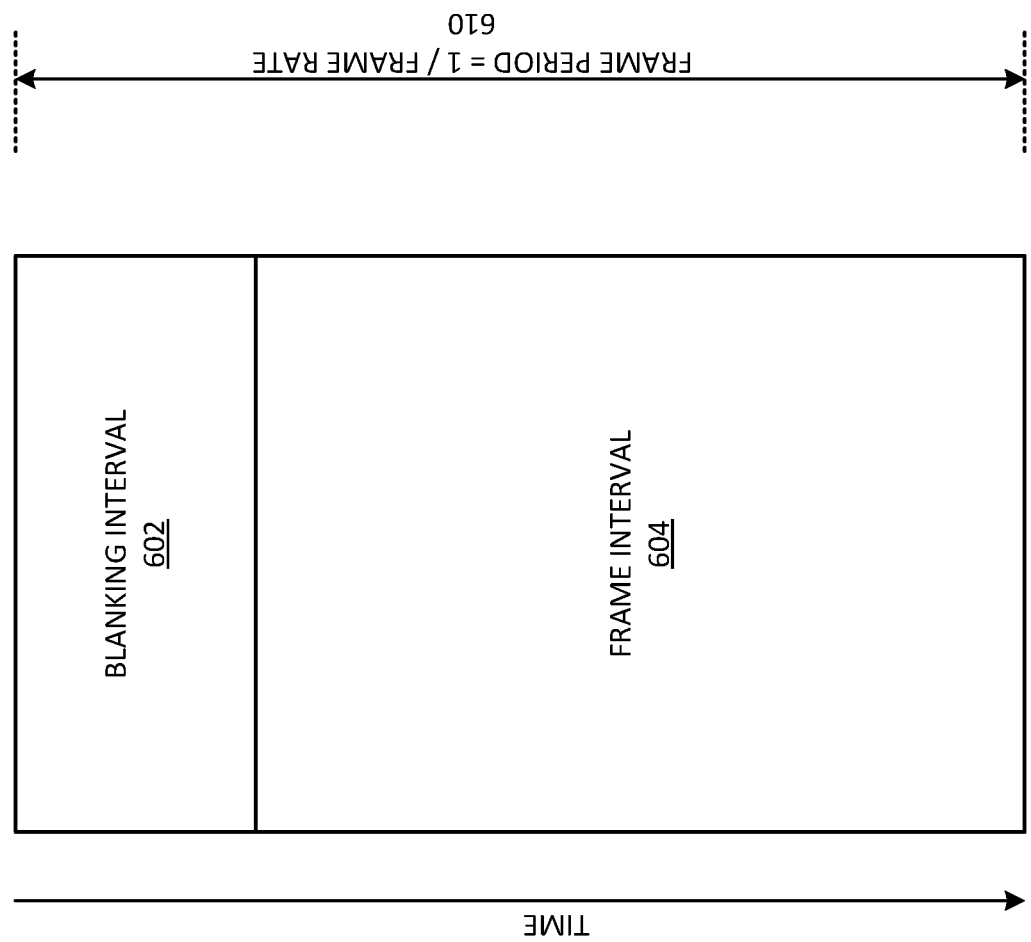
FIG. 6A illustrates a frame period with a vertical-blanking interval and a frame driving interval.

FIGS. 6A through 6D illustrate different ways that the components of FIG. 5 can drive a frame onto a display in different embodiments. FIG. 6A illustrates a frame period 610 with a vertical-blanking interval 602 and a frame interval 604 (e.g., without any mid-frame blanking intervals). Vertical-blanking interval 602 is the time between the end of the final line of the current frame being driven on display 102 (e.g., frame 604) and the beginning of the first line of the next frame being driven on display 102. In other words, a blanking interval is when display driver 522 pauses driving pixels to display 102. Frame interval 604 is the time during which image data is driven onto display 102 by display driver 522 under command of display controller 516, with the help of timing controller 518. Without mid-frame blanking, blanking interval 602 occurs at the frame rate (e.g., 30, 60, 120, and/or 180 Hz). The frame rate is defined as the reciprocal of the total amount of time available to drive a frame (e.g., not the reciprocal of frame interval 604). As used herein, the total amount of time available to drive a frame is the frame period, which is the reciprocal of the frame rate.

As noted above, driving pixels, lines, and/or frames to display 102 by display driver 522 causes noise (e.g., radio-frequency interference as a result of switching) that may interfere with sensor 250. The noise environment at display 102 is dynamic. The frequency of the noise as well as the time of occurrence (e.g., during a frame period) may change based on the type of image that is being displayed and/or the rate at which the image content changes. In particular, an LCD may impose impulse noise on sensor 250 at harmonics of its vertical synchronization (Vsync) and its horizontal synchronization (Hsync).

Sensing circuitry 200 and display driver 522 may be tightly integrated into proximate layers or the same layer of display 102 (e.g., when using an in-cell touch display or other similar touch-screen technology). Because of the proximity between sensor 250 and display driver 522 (which are closer to one another with each generation of device), the noise issue is a growing problem.

If display driver 522 is driving pixels to display 102 at the same time that sensing circuitry 200 is sensing pen 120, then sensing circuitry 200 may be susceptible to interference (e.g., noise) from display driver 522. Therefore, because of the noise generated during frame interval 604, sensing circuitry 200 may take advantage of the quiet blanking interval 602 to sense pen 120 and/or fingertip 140. Sensing at the display rate (e.g., 30, 60, 120, and/or 180 Hz), however convenient for display 102, may not be optimal for sensing circuitry 200 and/or pen 120. That is, pen 120 and/or sensing circuitry 200 have requirements of their own (e.g., required accuracy, battery life) that may make sensing at the display rate less than optimal.

Figure 6B:
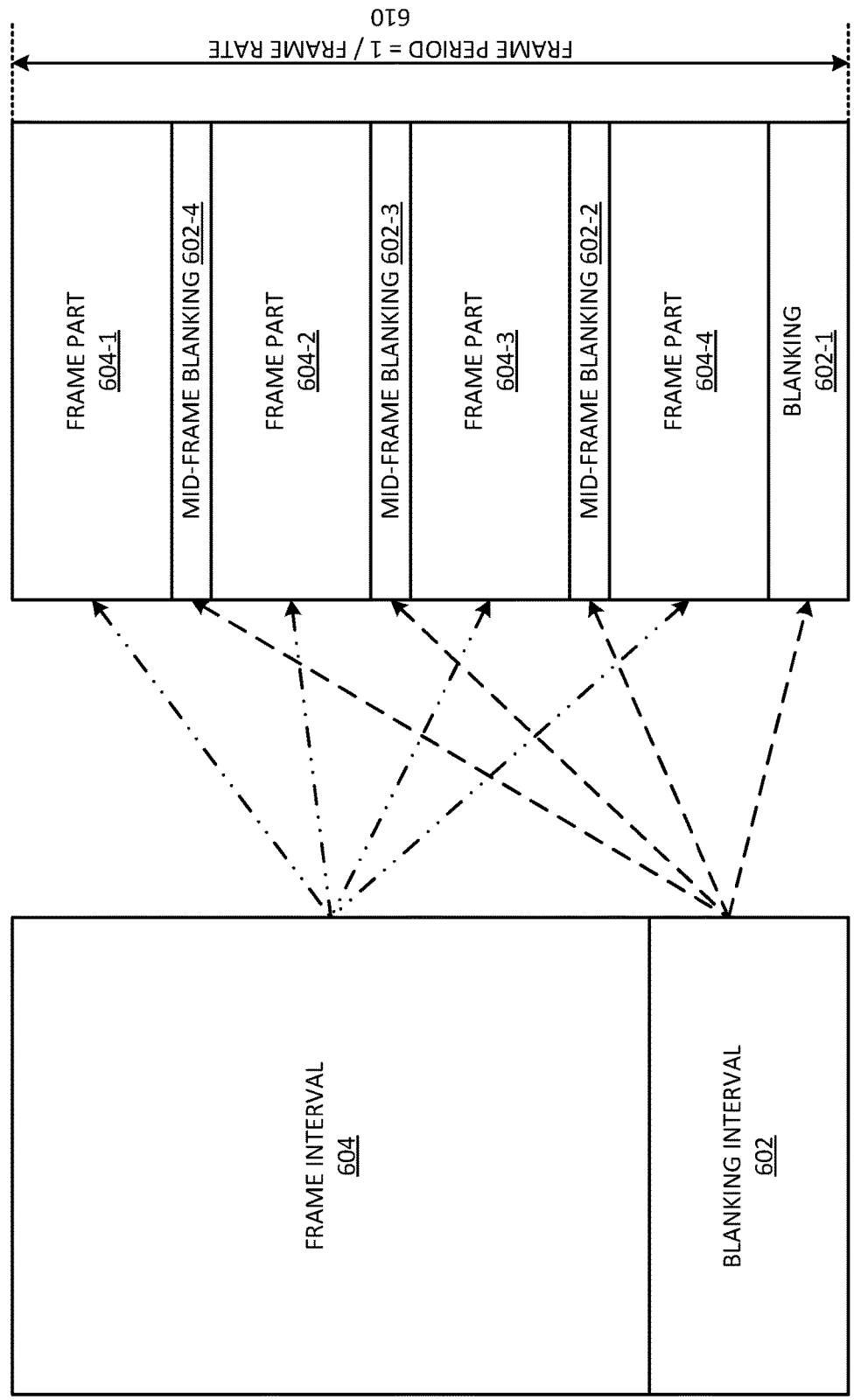
FIG. 6B illustrates a frame period with a vertical-blanking interval and mid-frame blanking intervals in one embodiment.

To increase the rate of occurrence of blanking intervals, and without changing the frame rate, blanking interval 602 may be distributed in time (e.g., throughout frame interval 604). FIG. 6B illustrates a frame period with a vertical-blanking interval and mid-frame blanking intervals in one embodiment. The left side of FIG. 6B shows the same blanking interval 602 and frame interval 604 shown in FIG. 6A. As shown on the right side of FIG. 6B, some of blanking interval 602 (two fifths) remains after driving frame 604: blanking interval 602-1. Further, some of blanking interval (three fifths) is distributed into three blanking intervals: mid-frame blanking 602-2, mid-frame blanking 602-3, and mid-frame blanking 602-4. As a result, frame interval 604 has been split into three equal intervals: frame-part intervals 604-2, 604-3, and 604-4.

In one embodiment, inserting mid-frame blanking intervals does not change the frame period (e.g., frame period 610) used when driving frames to display 102. The frame period is defined herein as the total amount of time available to drive a frame (e.g., the reciprocal of frame rate). Hence, the frame rate may also remain the same when inserting or using mid-frame blanking intervals. For simplicity, FIG. 6B relates to distributing vertical blanking interval 602 throughout frame interval 604 and does not consider horizontal blanking intervals, with the understanding that blanking interval 602 may be distributed anywhere throughout frame interval 604 (e.g., between the driving of any lines and/or any two pixels).

During mid-frame blanking intervals 602-2, 602-3, and 602-4 (as well as during vertical blanking interval 602-1), sensing circuitry 200 may sample sensor 250 to detect pen 120 and/or fingertip 140. In one embodiment, the blanking intervals may be chosen and scheduled such that the frame period does not exceed a threshold (e.g., that the frame rate does not drop below a threshold such as 30, 60, 120, or 180 Hz). In other words, all the time for driving the frame (sum of all the frame or frame part intervals) plus all the time for not driving the frame (sum of all the blanking intervals) does not exceed the frame period.

FIG. 6C is a timing diagram for driving the exemplary frame during the frame period 610 on the right side FIG. 6B. During frame period 610-1, the frame is driven to display 102 during frame-part intervals 602-1, 602-2, 602-3, and 602-4. The frame is not driven to display 102 during blanking intervals 602-1, 602-2, 602-3, and 602-4. The interval periods repeat themselves for the next frame period 610-2. In the embodiment of FIG. 6B, the interval pattern for driving and blanking repeats itself every frame period, until the pattern is changed. In other words, the positions of the blanking intervals from frame to frame remain the same relative to the beginning of the frame. In one embodiment, the interval pattern for driving and blanking may be changed by an application and/or the operating system running in computing device 101, for example.

Repeating the interval pattern every frame period (e.g. positioning the blanking intervals at the same time) may be convenient for display controller 516 and display driver 522. Repeating the pattern for every frame period, however, may not be optimal for sensing circuitry 200 and/or pen 120. Further, changing the interval pattern in software may not provide the desired speed for changing the blanking intervals.

In one embodiment described below, the timing of blanking intervals relative to the start of the frame may change from frame to frame. Further, the blanking intervals may be driven by sensing circuitry 200 (e.g., via pen 120) and display controller 516, which may enable faster changes of the blanking interval relative to the beginning of the frame period.

Figure 6D:
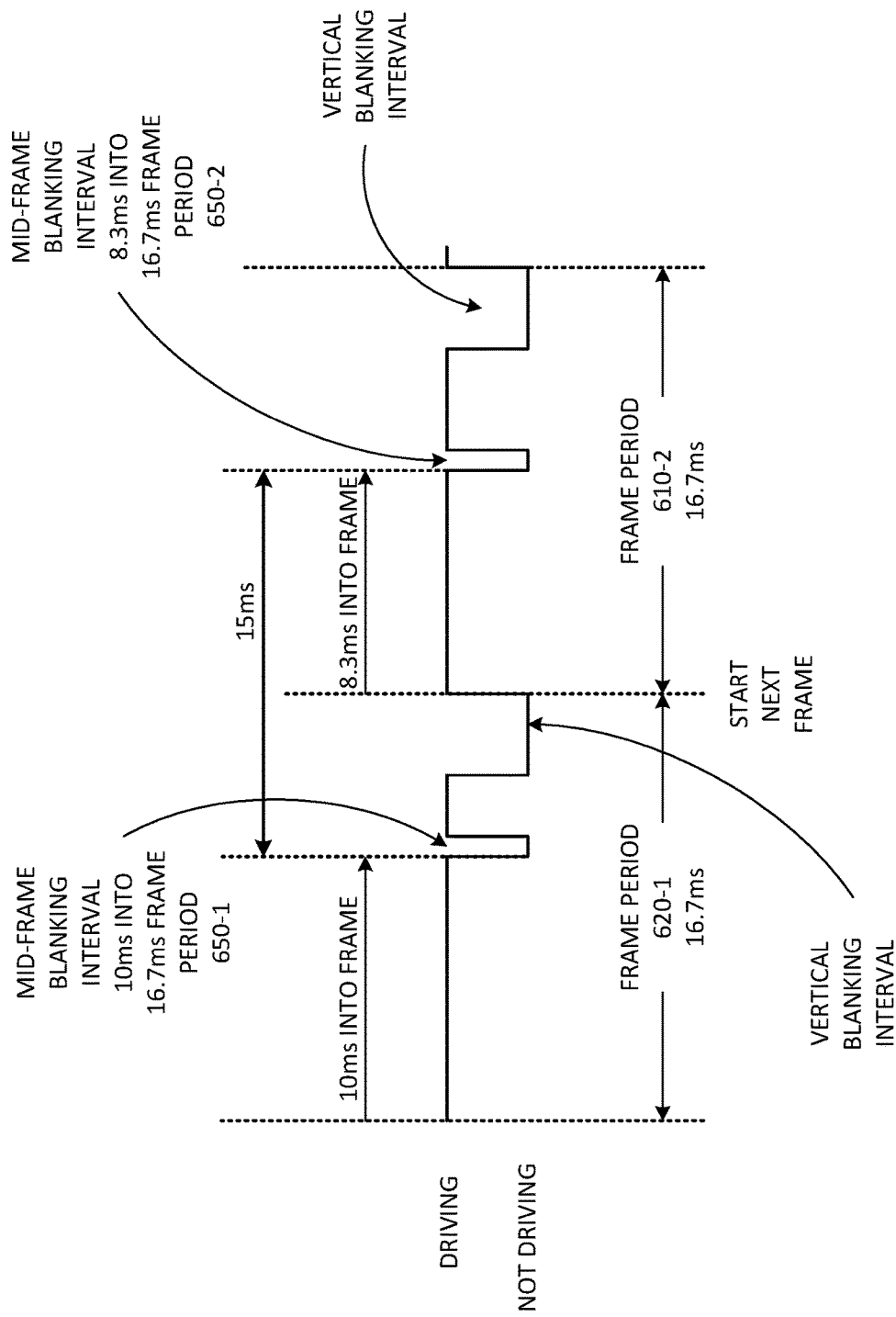
FIG. 6D is a timing diagram for a frame period with a vertical-blanking interval and mid-frame blanking intervals located in different parts of a frame period in one embodiment.

FIG. 6D is a timing diagram for a frame period with a vertical-blanking interval and mid-frame blanking intervals located in different parts of a frame period in one embodiment. As described above, in one embodiment, pen 120 transmits a timing signal with a 15 ms period. Therefore, sensing circuitry 200 may have a sensing window (e.g., and a blanking interval) every 15 ms. Because the sensing circuitry 200 (and pen 120) is asynchronous with display 102, however, the desired blanking interval could occur anywhere in the 16.7 ms frame period (e.g., when the frame rate is 60 Hz). As shown in FIG. 6D, a mid-frame blanking interval occurs 10 ms into the frame period (of 16.7 ms) for period 620-1; and a mid-frame blanking interval occurs 15 ms after the previous mid-frame blanking interval, which is 8.3 ms into the 16.7 ms frame period 610-2. Although a third 16.7 ms frame period is not shown, a third blanking interval may occur 15 ms after the second blanking interval, which would be 6.6 ms into the third frame period of 16.7 ms. As the term is used herein, a "sensing window" is the period of time during which sensing circuitry 200 may sample sensor 250. A blanking interval may or may not occur during the sensing window.

Figure 7:
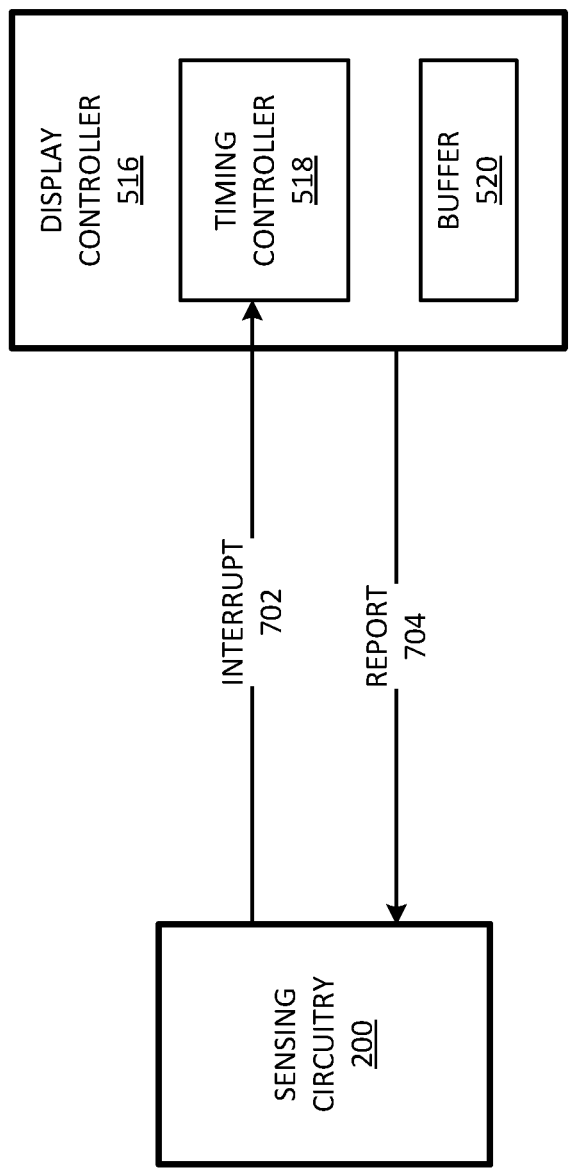
FIG. 7 is a block diagram illustrating communication between sensing circuitry of a display and a timing controller of a display controller in a computing device in one embodiment.

In one embodiment, sensing circuitry 200 may communicate timing information to display controller 516 and/or timing controller 518 for scheduling blanking intervals. FIG. 7 is an exemplary block diagram showing communications between sensing circuitry 200 and display controller 516 and/or timing controller 518. As shown in FIG. 7, sensing circuitry 200 may send an interrupt signal 702 to timing controller 518 to request or demand a blanking interval for a period of time. In one embodiment, interrupt signal 702 may be sent or scheduled to be sent according to timing information derived from signal 124 sent by pen 120 (e.g., from beacons 440). Further, in one embodiment, display controller 516 may report to sensing circuitry 200 regarding whether a blanking interval occurred and when it occurred (e.g., whether or not a blanking interval was requested). In this embodiment, sensing circuitry 200 may use the information reported by display controller 516 to improve sensing calculations with knowledge of when quiet blanking intervals have occurred.

Figure 8:
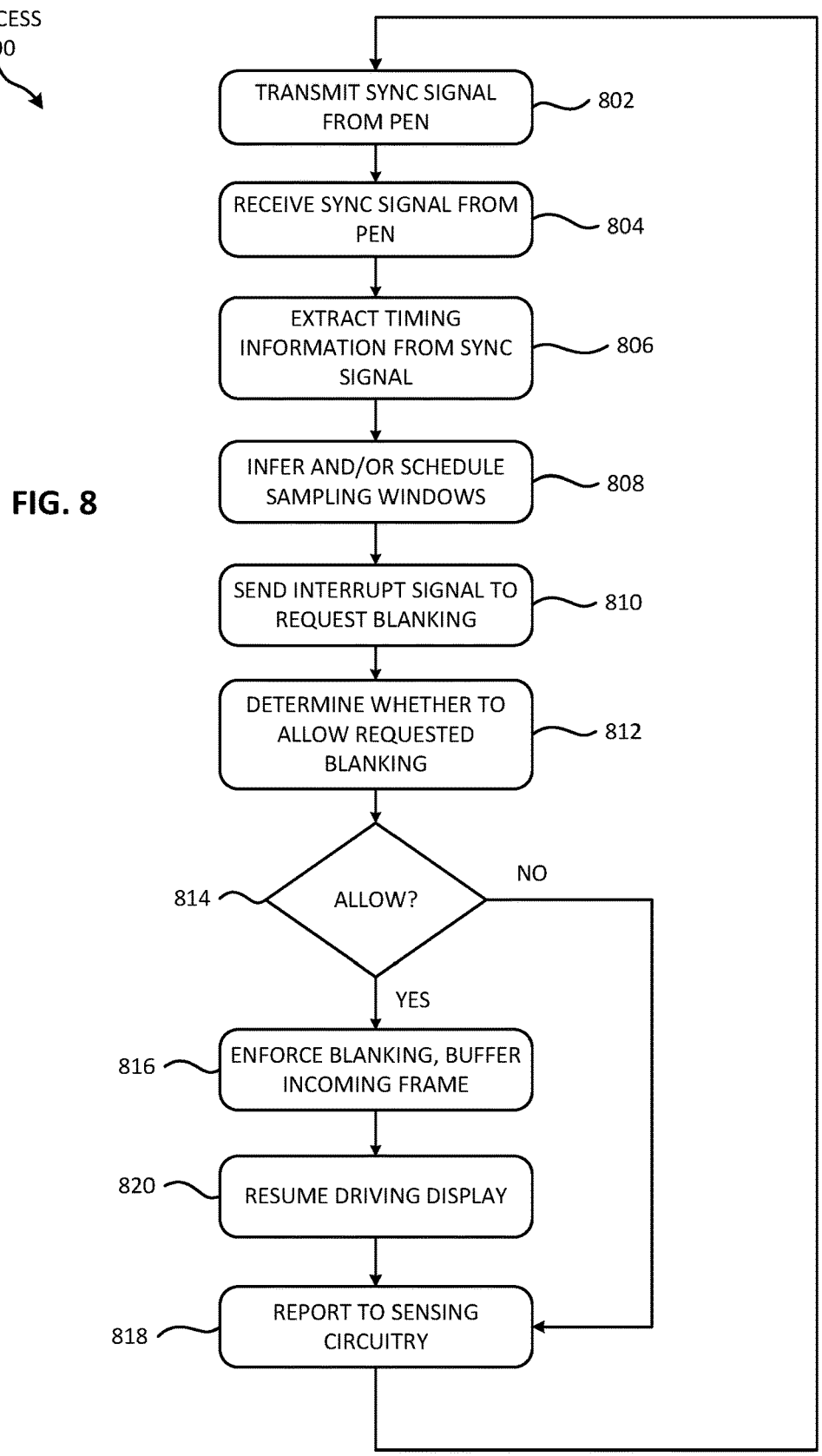
FIG. 8 is a flowchart of a process for inserting mid-frame blanking intervals between intervals for driving a frame.

FIG. 8 is a flowchart of a process 800 for inserting mid-frame blanking intervals between intervals for driving a frame in one embodiment. Process 800 may be performed by the components of pen 120 and/or computing device 101. Process 800 is described with the following example: pen 120 transmits signal 124 as shown in FIG. 4, e.g., a 15 ms periodic signal with beacons 440 separated 15 ms apart and pressure signals 450 separated 15 ms apart, with the pressure signals 450 occurring 7.5 ms after beacon signals 440. In this example, display 102 is displaying at a 60 Hz frame rate.

Process 800 may start with pen 120 transmitting a sync signal (block 802) and computing device 101 receiving the sync signal (block 804). For example, pen 120 transmits pen signal 124 (shown in FIG. 4) that includes beacons 440.

Beacons 440 convey timing information (e.g., from the rising or falling edge of beacons 440). Pen signal 124 is received in sensor 250.

Process 800 continues with the extraction of the timing information (block 806). For example, based on the rising and/or falling edge of beacon 440, sensing circuitry 200 can determine a periodic 15 ms clock, assuming that beacons 440 are spaced 15 ms apart in the example of FIG. 4. Sensing circuitry 200 may use the rising and/or falling edge of beacons 440 to keep in sync (e.g., using a phase-locked loop or PLL) with pen 120 transmissions and the scheduling of sampling windows.

Process 800 may continue with sensing circuitry 200 inferring and scheduling sampling windows for sampling signals received by sensor 250 (block 808). The sync signal extracted from signal 124 (block 806) may be indicative of the repetition rate or the repetition period of signal 124. In the current example, sensing circuitry 200 may infer that a first sampling window should take place every 15 ms (the period between beacons 440) for a window duration of 1 ms. This first sampling window may coincide with beacons 440, during which sensor 250 may sample beacons 440. In another example, the first sampling window can be shorter than the signal burst. For example, the first sampling window may coincide with beacons 440 every 15 ms and last 375 µs (e.g., shorter than the signal burst). In another embodiment, the sampling window could be longer than the signal burst.

Sensing circuitry 200 may also infer that a second sampling window should take place every 15 ms for a window duration of 1 ms, offset from the first sampling window by 7.5 ms. The second sampling window may coincide with pressure signals 450 (shown in FIG. 4), during which sensor 250 may sample pressure signals 450. Again, the sampling window may be shorter than the signal burst, such as a sampling window of 375 µs. The sync signal (extracted in block 806) is also indicative of (or informs) the timing of the second sensing window (e.g., the timing of the second sensing window is based on the repetition rate).

Process 800 may continue by sending an interrupt signal to request a blanking interval for sensor 250 to receive signal 124 in a quieter environment (block 810). In the current example, sensing circuitry 200 may send an interrupt signal 702 to timing controller 518 of display controller 516 to coincide with the first sampling window (e.g., with beacons 440). Because sensing circuitry 200 is asynchronous relative to timing controller 518, sensing circuitry 200 is not aware of the current state of driving a frame to display 102 (e.g., the current time in the current frame period).

Sensing circuitry 200 sends interrupt signal 702 to display controller 516 so that display controller 516 has the information to enforce a blanking interval to coincide with the first sampling window (e.g., with beacons 440). That is, sensing circuitry 200 may send interrupt signal 702 as a request for a quiet period during the first sensing window to improve the information sensed by sensor 250. In response to the request, display controller 516 may enforce a blanking interval during the first sensing window so that sensor 250 can more accurately sense beacon 440 to determine the location of tip 122 of pen 120, the accuracy of which can improve user experience. In this case, it may be preferable to enforce a blanking interval during first sensing window.

Sensing circuitry 200 may also send an interrupt signal 702 to timing controller 518 to coincide with the second sampling window (e.g., coincide with pressure signals 450). Sensing circuitry 200 may send an interrupt signal 702 to display controller 516 so that display controller 516 has the information to enforce a blanking interval to coincide with the second sampling window. That is, sensing circuitry 200 may send interrupt signal 702 as a request for a quiet period during the second sensing window to improve the information sensed by sensor 250. In response to the request, display controller 516 may enforce a blanking interval during the second sensing window to improve the accuracy of the information interpreted in pressure signals 450.

Sensing circuitry 200 may send an interrupt signal 702 to timing controller 518 to allocate blanking intervals based on numerous factors. For example, in one embodiment, sensing circuitry 200 may not request a quiet period (e.g., blanking interval) for sensing pressure signals 450. That is, sensing circuitry 200 may request blanking intervals to coincide with beacons 124 and not pressure signals 450 if for some reason more accuracy is desired at that moment for beacons 430 and all blanking intervals are allocated for sensing beacons 440.

Interrupt signal 702 may include timing information, such as the length of the desired blanking interval and when the blanking should begin. In one embodiment, blanking takes place immediately for the requested blanking interval. In another embodiment, interrupt signal 702 may request that the blanking interval repeat at a particular rate, for example, going forward until another interrupt signal 702 is sent from sensing circuitry 200 to timing controller 518.

In one embodiment, sensing circuitry 200 may send an interrupt signal for one sensing window at the expense of another sensing window. For example, in one embodiment, the vertical-blanking interval (e.g., blanking interval 602) that would otherwise be available may be considered the "total available blanking interval" that can be distributed into mid-frame blanking intervals. Thus, if only a total of 15 ms is available for blanking, sensing circuitry 200 may allocate that blanking interval for beacons 440 rather than pressure signals 450. If signal 124 includes more information than pressure signals 450, for example, then sensing circuitry 200 could schedule the total available blanking time to coincide with the portions of signal 124 that are most susceptible to noise.

A determination may be made regarding whether the interrupt should be accepted or denied (block 812) (e.g., whether the requested blanking interval should be enforced). This determination may be made by sensing circuitry 200 as part of scheduling blanking intervals or by display controller 516. For example, display controller 516 may determine that the requested blanking intervals may create undesirable visual effects, such as "tearing," and display controller 516 could deny the request for a blanking interval (block 814: NO).

Display controller 516 (and/or sensing circuitry 200) may determine that the blanking interval requested in interrupt signal 702 would slow the frame rate unacceptably (e.g., to below 60 Hz) or extend the frame period (e.g., beyond 16.7 ms) unacceptably. In this case, display controller 516 may deny the request for a blanking interval (block 814: NO). For example, if sensing circuitry 200 requested a 1 ms blanking interval at 16.0 ms into the fame period, and display controller 516 still needed 0.7 ms to complete driving an image to display 102, then enforcing a 1 ms blanking interval could potentially delay completion of the frame and extend the period by 0.3 ms. Display controller 516 could find this unacceptable and could deny the request. On the other hand, display controller 516 could delay completion of frame period at the expense of the next frame period (e.g., borrowing time from a future vertical-blanking interval in a future frame period).

If the request for the blanking interval is acceptable (block 814: YES), then display controller 516 may enforce a blanking interval in the current frame (block 816). Enforcing a blanking interval means pausing the driving of a frame to display 102 (e.g., during the sensing window, which may be during any part of the sensing window). To do this, display controller 516 may stop sending frame information to display driver 522 and keep the information in buffer 520. In one embodiment, display controller 516 may continue to receive image data from memory 512 and store it in buffer 520 (e.g., as though no blanking interval were being enforced) (block 818).

In the current example, sensing circuitry 200 may send interrupt signal 702 to timing controller 518 to request a mid-frame blanking interval (e.g., sensing window) when a beacon is expected to appear in signal 124. As shown in FIG. 6D, timing controller 518 enforces mid-frame blanking interval 650-1 that happens to be 10 ms into a frame period of 16.7 ms. The term "happens to be" is used because sensing circuitry 200 may not be aware of the current time position in frame period 620-1. That is, sensing circuitry 200 may be asynchronous with respect to timing controller 518. Fifteen milliseconds (15 ms) later, sensing circuitry 200 sends another interrupt signal 702 for a mid-frame blanking interval (e.g., a sensing window) to timing controller 518. As shown in FIG. 6D, timing controller 518 enforces mid-frame blanking interval 650-2 that happens to be 8.3 ms into a frame period of 16.7 ms. This pattern may continue with the next requested blanking interval happening to be 6.6 ms into a frame period of 16.7 ms. Although the term "mid-frame blanking interval" is used, the requested and enforced blanking interval may not actually occur mid frame, but may occur during a scheduled vertical-blanking interval.

Once the blanking interval is over, then the update of display 102 resumes (block 820). If the output rate of buffer 826 is the same as the input rate, then buffer 520 may be as big as the entire frame to ensure that no information is lost. If the output rate of buffer 826 is faster than the input rate, then the size of buffer 520 could be reduced (e.g., to be less than the entire frame).

In one embodiment, the decision regarding whether to allow the interrupt or not (blocks 814 and 812) may be based on whether information would be lost (e.g., whether buffer 520 would overflow resulting in lost information). That is, if allowing the interrupt would cause information to be lost (e.g., buffer 520 overflow), then the request for blanking may be denied (block 814: NO). On the other hand, if the interrupt would not cause information to be lost (e.g., buffer 520 has sufficient available space when considering the incoming rate and requested blanking interval), then this factor would weigh toward allowing the request for blanking (block 814: YES). In one embodiment, a blanking interval may be enforced even when information is lost (e.g., buffer 520 overflows) depending, for example, on the type of image being displayed on display 102.

Assuming that the blanking request has been allowed (block 814: YES), then display controller 516 can resume having display driver 522 drive display 102 after the blanking interval (block 820). In one embodiment, report 704 (such as a signal) is provided to sensing circuitry (block 818). If blanking is enforced (block 816), such information may be useful to sensing circuitry 200. For example, digitizer 225 may weigh information sensed during the blanking interval more heavily (e.g., assuming that there is less noise). On the other hand, digitizer 225 may weigh information sensed during a noisy period less heavily (e.g., knowing that a blanking interval was not enforced). In other words, sensing circuitry 200 may determine a characteristic of pen 120 and/or fingertip 140 based on the report signal (e.g., whether or not the display controller paused the driving of the frame on the display in response to the interrupt signal). The characteristic may include, for example, the location of pen 120 or fingertip 140 or the pressure on tip 122.

As noted above, sensing circuitry 200 may sense pen 120 differently than sensing fingertip 140. That is, sensing circuitry 200 may send trigger signals along some conductors 258 when sensing fingertip 140; and may not send trigger signals along conductors 258 when sensing signal 124 from pen 120. In one embodiment, sensing circuitry 200 may schedule sensing windows for sensing fingertip 140 during times sensing circuitry 200 knows it will not be sensing signal 124 from pen 120. For example, sensing circuitry 200 may schedule a sensing window (e.g., blanking interval) to occur between beacons 440 and pressure signals 450. After scheduling a sensing window for sensing fingertip 140, sensing circuitry 200 can send an interrupt signal 702 to display controller 516 for a blanking interval. Process 800 may continue through blocks 812 through 818 as described above.

When pen 120 is not present and signal 124 does not provide timing information to sensing circuitry 200, sensing circuitry 200 may still be asynchronous relative to timing controller 518. In this case, pen 120 is not present to transmit signal 124, signal 124 (and hence the sync signal) is not received by sensor 250, and timing information from sync signal is not extracted (blocks 802, 804, and 806 may not occur). Nonetheless, sensing circuitry 200 may still generate a periodic clock signal for sensing purposes and may still send interrupts to timing controller 518 for scheduling and enforcing sensing windows and blanking intervals. In other words, pen 120 and signal 124 does not have to be the source of timing information to sensing circuitry 200. In this embodiment, sensing circuitry 200 may generate its own timing information and process 800 may begin at block 808 with the scheduling of sampling windows to be requested with interrupt signals (block 810). Further, the timing of sensing circuitry 200 in this embodiment may still be asynchronous from display driver 516 and timing controller 518. This embodiment may be used, for example, while sensing fingertip 140, sensing passive pens, and/or sensing any other device by sensor 250.

In other embodiments, pen 120 may be present but too distant from display 102 for sensor 250 to receive signal 124. In this case, although pen 120 is transmitting signal 124 (block 802), signal 124 (and hence the sync signal) is not received by sensor 250 and timing information from sync signal is not extracted (blocks 804 and 806 may not occur). In this case, sensing circuitry 200 may generate its own timing information and process 800 may begin at block 808 with the scheduling of sampling windows to be requested with interrupt signals (block 810). Again, the timing of sensing circuitry 200 in this embodiment may be asynchronous from display driver 516 and timing controller 518. This embodiment may be used, for example, while searching for pen 120 (e.g., scheduling sampling windows and requesting blanking intervals periodically throughout a frame period to maximize likelihood of detecting beacon 440). Once signal 124 is found, then sensing circuitry 200 may switch from a search mode to a mode in which the timing of sensing circuitry 200 is synchronized with signal 124 of pen 120. Likewise, interrupts 702 may switch from a search mode to being synchronized with signal 124.

As a result of process 800, and because of the asynchronous nature of pen 120/sensing circuitry 200 and timing controller 518, blanking intervals 650 may be scheduled and enforced anywhere during a frame period, as shown in FIG. 6D. Further, as shown in FIG. 6D, the pattern of blanking intervals can change from one frame period to the next frame period: e.g., three sequential frames could have three different blanking intervals.

In another example, signal 124 may send a signal with a repetition period of 15 ms with four signal bursts. In this case, sensing circuitry 200 may schedule a sampling window every 3.75 ms (which occurs four times each 15 ms) and request a blanking interval of 375 μs (for a total of 1.5 ms of blanking intervals). Thus, the total requested blanking intervals is 10% (1.5 ms/15 ms) evenly spaced in the repetition period of signal 124. In this example, however, if the frame rate of display 102 is 60, 120, or 180 Hz, the pattern of blanking intervals may change from frame period to frame period (e.g., the beginning of the first blanking period will be different relative to the start of the frame period) as a result of timing controller 518 being asynchronous with sensing circuitry 200.

In another example, pen 120 may transmit 124 such that the repetition period is 30 ms. This may mean that sensing circuitry 200 requests blanking intervals every other frame period, for example, since the frame period is 16.7 ms. The added flexibility of scheduling sensing windows and requesting blanking periods may not only increase accuracy, but can also save power and extend battery life of pen 120, for example. In one embodiment, the added flexibility also enables pen 120 to operate without having to receive a sync signal to be synchronous with timing controller 518 of display 102.

As discussed above, sensing circuitry 200 may perform sensing when display driver 522 is not driving pixels to display 102. In one embodiment, sensing circuitry 200 performs sensing in the time period between frames (e.g., the vertical blanking interval). At times, however, it is beneficial for pen 120 to be sensed at a higher rate than the frame rate. In another embodiment, therefore, sensing circuitry 200 can perform sensing at any time during a frame period. Hence, in one embodiment, sensing circuitry 200 may not only sense during mid-frame blanking intervals but may also request that display controller 516 interrupt driving of pixels to display 102 by display driver 522 within a frame to create these mid-frame blanking intervals.

Sensing circuitry 200 may nonetheless still perform sampling while display driver 522 is driving pixels to display 102 despite the noise. As noted, however, the noise may make the estimate of location of pen 120 on display 102 less accurate.

Embodiments described herein allow for sampling of sensor 250 at a rate that is not necessarily a whole number multiple of the frame rate. For example, if the frame rate is 60 Hz, then the sampling frequency is not limited to 60, 120, 180, 240 Hz, etc. For example, as described, sensing circuitry 200 detects pen signal 124 and may situate sampling windows over time to track or correspond to when pen 120 is transmitting signal 124. In one embodiment, the pen transmits signal 124 periodically with a 15 ms period (e.g., at a rate of approximately 66 Hz). In one embodiment, display 102 updates with a 16.7 ms frame period (e.g., 60 Hz frame rate). Over time, therefore, pen 120 can transmit signal 124 anywhere relative to the frame period. In one embodiment, sensing circuitry 200 can request a blanking interval of timing controller 518 anywhere in the frame period.

In another embodiment, display controller 516 and timing controller 518 may send report 704 to sensing circuitry 200 even when no blanking interval was requested via interrupt signal 702. In this embodiment, sensing circuitry 200 may use the information to weigh sensed information during quiet periods (blanking intervals) more heavily than noisy periods (driving periods), for example. Also, even without interrupt signal 702, timing controller 518 may schedule its own mid-frame blanking intervals and report these intervals to sensing circuitry 200. For example, timing controller 518 could enforce a blanking interval of 100 μs every 2 or 3 ms and report this blanking interval to sensing circuitry 200. Again, sensing circuitry 200 could use this blanking information to inform and improve its calculations. That is, information sensed during quiet periods may be higher quality and more accurate and can be weighed more heavily in calculations. In this embodiment, blanking intervals could be scheduled and enforced frequently enough that at least a portion of signal bursts 440, 550 would fall into a blanking interval even if that blanking interval were small. For example, if all signal bursts 440, 450 were 1 ms, then scheduling a blanking interval every 0.5 ms would ensure that a blanking interval coincided with every signal burst 450, 550.

Even when timing controller 518 and sensing circuitry 200 are set to operate at the same frequency (e.g., the frame rate of timing controller 518 is the same as the repetition rate of sensing circuitry 200 and/or pen 120), the two may still be "asynchronous." That is, if there is no feedback between the one component to the other (such as in a PLL), then the respective signals will "drift," meaning that the rates are not actually identical and are thus not synchronous (e.g., they are asynchronous). Further, when the sampling rate of sensing circuitry is a whole-number multiple (or a whole-number divisor) of the frame rate, the two can be considered synchronous if the two track each other, even though the frequency of one is greater than the other.

No element, act, or instruction used in the description of the present application should be construed as critical or essential to the invention unless explicitly described as such. As used herein, the articles "a" and "the" and the term "one of" are intended to include one or more items. Further, the phrase "based on" means "based, at least in part, on" unless explicitly stated otherwise.

In the preceding specification, various preferred embodiments are described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. An apparatus comprising:
    a display controller having a timing controller configured to drive frames on a display, wherein timing of the timing controller is based on a frame rate of the display; and
    sensing circuitry to detect an object on or near the display, wherein the sensing circuitry senses for the object during sensing windows, wherein timing of the sensing windows is based on a repetition rate of the object, wherein the timing of the sensing windows and the timing of the timing controller are asynchronous in that the occurrence of the sensing windows in consecutive display frames occurs at different times within the display frames, and wherein the display controller is configured to pause driving a frame on the display during the sensing windows.

2. The apparatus of claim 1, wherein the object is a pen, wherein the sensing circuitry is configured to detect a signal from the pen, wherein the signal from the pen includes a sync signal indicative of the repetition rate, and wherein the sensing circuitry is configured to detect the signal from the pen during the sensing windows.

3. The apparatus of claim 1, wherein the sensing circuitry is configured to send an interrupt signal to the display controller, and wherein the display controller is configured to pause the driving of the frame on the display in response to the interrupt signal.

4. The apparatus of claim 3, wherein the interrupt signal is associated with one of the sensing widows.

5. The apparatus of claim 4, wherein the display controller determines whether pausing the driving of the frame on the display would cause a visual effect, and wherein the display controller is configured to not pause driving the frame on the display when the display controller determines that pausing the driving of the frame on the display would cause a visual effect.

6. The apparatus of claim 5, wherein the display controller is configured to send a report signal to the sensing circuitry indicating that the display controller did not pause driving the frame on the display in response to the interrupt signal.

7. The apparatus of claim 6, wherein the sensing circuitry is configured to determine a characteristic of the pen based on the report signal indicating that the display controller did not pause driving the frame on the display in response to the interrupt signal.

8. The apparatus of claim 1, wherein the repetition rate is greater than the frame rate.

9. The apparatus of claim 8, wherein the repetition rate is not a whole multiple of the frame rate.

10. A method comprising:
driving frames, by a display controller having a timing controller, to a display, wherein timing of the timing controller is based on a frame rate of the display; and
detecting, by sensing circuitry, an object on or near the display during sensing windows, wherein timing of the sensing windows are based on a repetition rate of the object, wherein the timing of the sensing windows and the timing of the timing controller are asynchronous in that the occurrence of the sensing windows in consecutive display frames occurs at different times within the display frames, and wherein driving the frames includes pausing the driving of a frame during the sensing windows.

11. The method of claim 10, wherein the object is a pen, further comprising:
sensing, by the sensing circuitry, a signal from the pen, wherein the signal from the pen includes a sync signal indicative of the repetition rate, and wherein the sensing circuitry is configured to detect the signal from the pen during the sensing windows.

12. The method of claim 11, further comprising:
receiving an interrupt signal in the display controller; and
pausing the driving of the frame to the display in response to the interrupt signal.

13. The method of claim 12, further comprising:
sending the interrupt signal from the sensing circuitry to the display controller, wherein the interrupt signal is associated with a sensing widow.

14. The method of claim 13, wherein pausing the driving of the frame includes:
determining whether pausing the driving of the frame on the display would cause a visual effect, and
pausing the driving of the frame when determined that pausing the driving of the frame would not cause the visual effect.

15. The method of claim 14, further comprising:
sending a report signal to the sensing circuitry indicating whether the display controller paused driving the frame on the display in response to the interrupt signal.

16. The method of claim 15, further comprising:
determining a characteristic of the based on the report signal indicating whether the display controller paused driving the frame on the display in response to the interrupt signal.

17. The method of claim 11, wherein the repetition rate is greater than the frame rate.

18. The method of claim 17, wherein the repetition rate is not a whole multiple of the frame rate.

19. An apparatus comprising:
a display controller having a timing controller configured to drive frames on a display, wherein timing of the timing controller is based on a frame rate of the display; and
sensing circuitry to detect an object on or near the display, wherein the sensing circuitry senses for the object during sensing windows, wherein timing of the sensing windows is based on a repetition rate of the object, wherein the timing of the sensing windows and the timing of the timing controller are asynchronous in that the occurrence of the sensing windows in consecutive display frames occurs at different times within the display frames, wherein the display controller is configured to send a report signal to the sensing circuitry indicative of when the display controller paused driving a frame on the display, and wherein the sensing circuitry is configured to determine a characteristic of the object by weighing information associated with a sensing window corresponding to when the display controller paused driving the frame on the display.

20. The apparatus of claim 19, wherein the sensing circuitry is configured to send an interrupt signal to the display controller, and wherein the display controller is configured to pause the driving of the frame on the display in response to the interrupt signal.

* * * * *